(12) United States Patent
Dhodapkar et al.

(10) Patent No.: US 9,290,668 B2
(45) Date of Patent: Mar. 22, 2016

(54) COATED POLYMERIC PARTICULATES, AND A PROCESS FOR COATING POLYMERIC PARTICULATES

(75) Inventors: Shrikant Dhodapkar, Lake Jackson, TX (US); Matthew J. Kalinowski, Freeland, MI (US); Suzanne M. Guerra, Lake Jackson, TX (US); Ashish Batra, Indiananpolis, IN (US); Ronald Wevers, Terneuzen (NL); Pascal E. R. E. J. Lakeman, Bergen Op Zoom (NL)

(73) Assignee: Dow Global Technologies LLC, Midland, MI (US)

( * ) Notice: Subject to any disclaimer, the term of this patent is extended or adjusted under 35 U.S.C. 154(b) by 61 days.

(21) Appl. No.: 13/703,146

(22) PCT Filed: Jun. 17, 2011

(86) PCT No.: PCT/US2011/040820
§ 371 (c)(1),
(2), (4) Date: Dec. 10, 2012

(87) PCT Pub. No.: WO2011/159977
PCT Pub. Date: Dec. 22, 2011

(65) Prior Publication Data
US 2013/0101852 A1   Apr. 25, 2013

Related U.S. Application Data

(60) Provisional application No. 61/356,220, filed on Jun. 18, 2010.

(51) Int. Cl.
*C09D 5/14* (2006.01)
*B29B 9/16* (2006.01)
(Continued)

(52) U.S. Cl.
CPC ... *C09D 5/14* (2013.01); *B29B 9/16* (2013.01); *B29B 13/065* (2013.01); *C08J 3/124* (2013.01); *B29B 2009/163* (2013.01); *C08J 2323/02* (2013.01); *Y10T 428/2998* (2015.01)

(58) Field of Classification Search
None
See application file for complete search history.

(56) References Cited

U.S. PATENT DOCUMENTS 4,960,644 A   10/1990   Hyche et al.
5,007,961 A   4/1991   Hyche et al.
(Continued)

FOREIGN PATENT DOCUMENTS

JP   H11335481 A   12/1999
JP   2000026649 A   1/2000
(Continued)

OTHER PUBLICATIONS

PCT/2011/040820, International Search Report and Written Opinion.
(Continued)

*Primary Examiner* — Alexandre Ferre (57) ABSTRACT

The instant invention provides coated polymeric particulates, and a method for producing polymeric particulates. The coated polymeric particulates according to the present invention comprise (a) one or more polymeric particulates; and (b) a coating composition present on at least a portion of at least one surface of said polymeric particulate, wherein said coating composition comprises a dispersion comprising: (1) one or more base polymers, (2) one or more stabilizing agents; (3) one or more biocide agents; (4) one or more neutralizing agents; and (5) water.

16 Claims, 5 Drawing Sheets

(51) Int. Cl.
  *B29B 13/06* (2006.01)
  *C08J 3/12* (2006.01)

(56) References Cited

U.S. PATENT DOCUMENTS

| | | | |
|---|---|---|---|
| 5,096,493 A | 3/1992 | Hyche et al. | |
| 5,334,644 A | 8/1994 | Gose et al. | |
| 5,443,910 A | 8/1995 | Gose et al. | |
| 6,051,617 A * | 4/2000 | Sasaki et al. | 521/59 |
| 6,610,282 B1 * | 8/2003 | Ghosh | 424/78.09 |

FOREIGN PATENT DOCUMENTS

| | | | |
|---|---|---|---|
| JP | 2000119435 A | 4/2000 | |
| JP | 2005015593 A | 1/2005 | |
| WO | 2009/035877 A1 | 3/2009 | |
| WO | WO 2009035877 A1 * | 3/2009 | B29B 9/16 |
| WO | 2009/094106 A1 | 7/2009 | |

OTHER PUBLICATIONS

PCT/2011/040820, International Preliminary Report on Patentability.

* cited by examiner

COATED POLYMERIC PARTICULATES, AND A PROCESS FOR COATING POLYMERIC PARTICULATES

CROSS-REFERENCE TO RELATED APPLICATIONS

This application is a non-provisional application claiming priority from the U.S. Provisional Patent Application No. 61/356,220, filed on Jun. 18, 2010, entitled "COATED POLYMERIC PARTICULATES, AND A PROCESS FOR COATING POLYMERIC PARTICULATES," the teachings of which are incorporated by reference herein, as if reproduced in full hereinbelow.

FIELD OF INVENTION

The instant invention relates to coated polymeric particulates, and a method for producing polymeric particulates.

BACKGROUND OF THE INVENTION

Some polymeric particulates may deform over time when exposed to stress and temperature conditions experienced during shipment. Additionally, the surfaces of polymeric particulates in contact with each other can sinter together at the interface thereby creating a bond. The combined effect of deformation and bonding at the contact points makes the polymeric particulates mass appear blocky.

Blockiness refers to the lumpy appearance of polymeric particulates in bags, boxes or railcars. In worst situation, the entire mass of the polymeric particulates may become a single lump or a block (hence called massing). This can be contrasted with polymeric particulates, where the polymeric particulates remain free-flowing regardless of stress, temperature and time history during shipment.

The blocking or massing of polymeric particulates creates a significant problem for end users. Blocky polymeric particulates are difficult to handle, and are especially problematic during blending, metering and feeding into extruders. The blocking problem applies to a wide variety of ethylene-alpha olefin copolymers, ethylene-propylene copolymers, EPDM, and EVA polymers.

Similarly, low molecular weight fraction component can migrate to the surface of a particle in low-crystalline polyolefins causing stickiness or tackiness. This results in significant problems during subsequent handling and processing in post-pelletization process.

Despite the research efforts in improving blockiness or stickiness in the past, there is still a need for a coated polymeric particulates having improved blocking and stickiness properties, and there is also a need for a coating process for polymeric particulates having improved blocking and stickiness properties.

SUMMARY OF THE INVENTION

The instant invention provides coated polymeric particulates, and a method for producing polymeric particulates.

In one embodiment, the instant invention provides coated polymeric particulates comprising (a) one or more polymeric particulates; and (b) a coating composition present on at least a portion of at least one surface of said polymeric particulates, wherein said coating composition comprises a dispersion comprising: (1) one or more base polymers, (2) one or more stabilizing agents; (3) one or more biocide agents; (4) one or more neutralizing agents; and (5) water.

In an alternative embodiment, the instant invention further provides a method for producing polymeric particulates comprising the steps of: (a) selecting one or more polymeric particulates; (b) selecting a coating composition comprising a dispersion comprising: (1) one or more base polymers, (2) one or more stabilizing agents, (3) one or more biocide agents, (4) one or more neutralizing agents, and (5) water; (c) applying said coating composition to at least one or more surfaces of said one or more polymeric particulates; and (d) thereby forming one or more coated polymeric particulates.

In an alternative embodiment, the instant invention provides coated polymeric particulates, and method of producing the same, in accordance with any of the preceding embodiments, except that the one or more polymeric particulates are selected from the group consisting of ethylene based polymers, and propylene based polymer.

In an alternative embodiment, the instant invention provides coated polymeric particulates, and method of producing the same, in accordance with any of the preceding embodiments, except that the one or more polymeric particulates are foam.

In an alternative embodiment, the instant invention provides coated polymeric particulates, and method of producing the same, in accordance with any of the preceding embodiments, except that the ethylene based polymer comprises an ethylene interpolymer.

In an alternative embodiment, the instant invention provides coated polymeric particulates, and method of producing the same, in accordance with any of the preceding embodiments, except that the propylene based polymer comprises a propylene interpolymer.

In an alternative embodiment, the instant invention provides coated polymeric particulates, and method of producing the same, in accordance with any of the preceding embodiments, except that the ethylene interpolymer is an interpolymer of ethylene and one or more α-olefin comonomers, or ethylene-propylene-diene-monomer (EPDM).

In an alternative embodiment, the instant invention provides coated polymeric particulates, and method of producing the same, in accordance with any of the preceding embodiments, except that the propylene interpolymer is an interpolymer of propylene and one or more α-olefin comonomers.

In an alternative embodiment, the instant invention provides coated polymeric particulates, and method of producing the same, in accordance with any of the preceding embodiments, except that the stabilizing agent comprises the reaction product of oleic acid and metal hydroxide in the presence of said water.

In an alternative embodiment, the instant invention provides coated polymeric particulates, and method of producing the same, in accordance with any of the preceding embodiments, except that the metal hydroxide is NaOH, or KOH.

In an alternative embodiment, the instant invention provides coated polymeric particulates, and method of producing the same, in accordance with any of the preceding embodiments, except that the dispersion has a pH in the range of greater than 8 and less than 12.

In an alternative embodiment, the instant invention provides coated polymeric particulates, and method of producing the same, in accordance with any of the preceding embodiments, except that the dispersion has a volume average particle size diameter in the range of from 0.1 to 5 micrometer.

In an alternative embodiment, the instant invention provides coated polymeric particulates, and method of producing the same, in accordance with any of the preceding embodiments, except that the dispersion has a volume average particle size diameter in the range of from 0.1 to 2 micrometer.

In an alternative embodiment, the instant invention provides coated polymeric particulates, and method of producing the same, in accordance with any of the preceding embodiments, except that the dispersion has a volume average particle size diameter in the range of from 0.1 to 1 micrometer.

In an alternative embodiment, the instant invention provides coated polymeric particulates, and method of producing the same, in accordance with any of the preceding embodiments, except that the dispersion has a solid content in the range of 35 to 65 weight percent, based on the total weight of the dispersion.

In an alternative embodiment, the instant invention provides coated polymeric particulates, and method of producing the same, in accordance with any of the preceding embodiments, except that the one or more biocide agents are selected from the group consisting of [heavy metals e.g mercury based], [formaldehyde], [formaldehyde donors e.g triazines], [cyanobutanes. e.g 1,2-dibromo-2,4-dicyanobutane (DBDCB) and 2-bromo-2-intropropane-1,3-diol (Bronopol)], [isothiazolinones e.g 1,2 benzisothiazolin-3-one (BIT)], [combination of 5-chloro-2-methyl-4-isothiazolin-3-one (CIT) and 2-methyl-4-isothiazolin-3-one (MIT)], and [2-methyl-4-isothiazolin-3-one (MIT)] and [combination of 2-methyl-4-isothiazolin-3-one (MIT) and 1,2 benzisothiazolin-3-one (BIT)].

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

The instant invention provides coated polymeric particulates, and a method for producing polymeric particulates. The coated polymeric particulates according to the present invention comprise (a) one or more polymeric particulates; and (b) a coating composition present on at least a portion of at least one surface of said polymeric particulate, wherein said coating composition comprises a dispersion comprising: (1) one or more base polymers, (2) one or more stabilizing agents; (3) one or more biocide agents; (4) one or more neutralizing agents; and (5) water.

(a) Polymeric Particulates

The polymeric particulate may be any polymeric material; for example, the polymeric material may be an olefin polymer. Exemplary olefin polymers include, but are not limited to, homopolymers of ethylene, and copolymers of ethylene and at least one ethylenically unsaturated monomer selected from the group consisting of $C_3$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids. Exemplary olefin polymers further include, but are not limited to, homopolymers of propylene, and copolymers of propylene and at least one ethylenically unsaturated monomer selected from the group consisting of $C_2$ and $C_4$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids. The olefin polymers are preferably elastomeric polymers. Exemplary elastomeric polymers include, but are not limited to, elastomeric ethylene copolymers such as ethylene/alpha-olefin copolymers or elastomeric propylene copolymers such as propylene/alpha-olefin copolymers. Elastomeric ethylene copolymers such as ethylene/alpha-olefin copolymers are copolymers of ethylene with at least one $C_3$-$C_8$ alpha-olefin (preferably an aliphatic alpha-olefin) comonomer, and optionally, a polyene comonomer, for example, a conjugated diene, a nonconjugated diene, a triene, etc. Elastomeric propylene copolymers such as propylene/alpha-olefin copolymers are copolymers of propylene with at least one $C_2$ or $C_4$-$C_8$ alpha-olefin (preferably an aliphatic alpha-olefin) comonomer, and optionally, a polyene comonomer, for example, a conjugated diene, a nonconjugated diene, a triene, etc. Examples of the $C_2$-$C_8$ alpha-olefins include, but are not limited to, ethene, propene, 1-butene, 4-methyl-1-pentene, 1-hexene, and 1-octene. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. Although not alpha-olefins in the classical sense of the term, for purposes of this invention certain cyclic olefins, such as norbornene and related olefins, are alpha-olefins and can be used in place of some or all of the alpha-olefins described above. Similarly, styrene and its related olefins (for example, alpha-methylstyrene, etc.) are alpha-olefins for purposes of this invention.

Polyenes are unsaturated aliphatic or alicyclic compounds containing more than four carbon atoms in a molecular chain and having at least two double and/or triple bonds, for example, conjugated and nonconjugated dienes and trienes. Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo-[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene, 5-vinyl-2-norbornene and 7-methyl-1,6-octadiene preferred nonconjugated dienes.

Examples of conjugated dienes include butadiene, isoprene, 2,3-dimethylbutadiene-1,3,1,2-dimethylbutadiene-1, 3,1,4-dimethylbutadiene-1,3,1-ethylbutadiene-1,3,2-phenylbutadiene-1,3, hexadiene-1,3,4-methylpentadiene-1,3,1, 3-pentadiene (CH$_3$CH=CH—CH=CH$_2$; commonly called piperylene), 3-methyl-1,3-pentadiene, 2,4-dimethyl-1,3-pentadiene, 3-ethyl-1,3-pentadiene, and the like; with 1,3-pentadiene a preferred conjugated diene.

Examples of trienes include 1,3,5-hexatriene, 2-methyl-1,3,5-hexatriene, 1,3,6-heptatriene, 1,3,6-cycloheptatriene, 5-methyl-1,3,6-heptatriene, 5-methyl-1,4,6-heptatriene, 1,3,5-octatriene, 1,3,7-octatriene, 1,5,7-octatriene, 1,4,6-octatriene, 5-methyl-1,5,7-octatriene, 6-methyl-1,5,7-octatriene, 7-methyl-1,5,7-octatriene, 1,4,9-decatriene and 1,5,9-cyclodecatriene.

Exemplary ethylene copolymers include ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene and ethylene/1,3,5-hexatriene. Exemplary propylene copolymers include propylene/ethylene, propylene/butene, propylene/1-octene. Exemplary terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene and ethylene/propylene/1,3,5-hexatriene. Exemplary tetrapolymers include ethylene/propylene/1-octene/diene (for example, ENB), ethylene/butene/1-octene/diene and ethylene/propylene/mixed dienes, for example, ethylene/propylene/5-ethylidene-2-norbornene/piperylene. In addition, the blend components can include minor amounts, for example, 0.05-0.5 percent by weight, of long chain branch enhancers, such as 2,5-norbornadiene (aka bicyclo[2,2,1]hepta-2,5-diene), diallylbenzene, 1,7-octadiene (H$_2$C=CH(CH$_2$)$_4$CH=CH$_2$), and 1,9-decadiene (H$_2$C=CH(CH$_2$)$_6$CH=CH$_2$).

In specific embodiments, polyolefins such as polypropylene, polyethylene, and copolymers thereof, and blends thereof, as well as ethylene-propylene-diene terpolymers, may be used. In some embodiments, olefinic polymers include homogeneous polymers described in U.S. Pat. No. 3,645,992 issued to Elston; high density polyethylene (HDPE) as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE).

Polymer compositions described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, are also suitable in some embodiments. Of course, blends of polymers can be used as well. In some embodiments, the blends include two different Ziegler-Natta polymers. In other embodiments, the blends can include blends of a Ziegler-Natta and a metallocene polymer. In still other embodiments, the polymer used herein is a blend of two different metallocene polymers. In other embodiments polymers produced from single site catalysts may be used. In yet another embodiment, block or multi-block copolymers may be used in embodiments of the invention. Such polymers include those described and claimed in WO2005/090427 (having priority to U.S. Ser. No. 60/553,906, filed Mar. 7, 2004).

In some particular embodiments, the olefin polymer is a propylene-based copolymer or interpolymer. In some embodiments, the propylene/ethylene copolymer or interpolymer is characterized as having substantially isotactic propylene sequences. The term "substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra.

In other particular embodiments, the olefin polymer may be ethylene vinyl acetate (EVA) based polymers. In other embodiments, the olefin polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

In certain embodiments, the olefin polymer can be an ethylene-octene copolymer or interpolymer having a density between 0.863 and 0.911 g/cc and melt index (190° C. with 2.16 kg weight) from 0.1 to 100 g/10 min. In other embodiments, the ethylene-octene copolymers may have a density between 0.863 and 0.902 g/cc and melt index (190° C. with 2.16 kg weight) from 0.8 to 35 g/10 min.

In certain embodiments, the olefin polymer can be a propylene-ethylene copolymer or interpolymer having an ethylene content between 5 and 20 percent by weight and a melt flow rate (230° C. with 2.16 kg weight) from 0.5 to 300 g/10 min. In other embodiments, the propylene-ethylene copolymer or interpolymer may have an ethylene content between 9 and 12 percent by weight and a melt flow rate (230° C. with 2.16 kg weight) from 1 to 100 g/10 min.

In certain other embodiments, the olefin polymer can be a low density polyethylene having a density between 0.911 and 0.925 g/cc and melt index (190° C. with 2.16 kg weight) from 0.1 to 100 g/10 min.

In other embodiments, the olefin polymer can have a crystallinity of less than 50 percent. In preferred embodiments, the crystallinity of the olefin polymer may be from 5 to 35 percent. In more preferred embodiments, the crystallinity can range from 7 to 20 percent.

In certain other embodiments, the olefin polymer can have a melting point of less than 110° C. In preferred embodiments, the melting point may be from 25 to 100° C. In more preferred embodiments, the melting point may be between 40 and 85° C.

In certain embodiments, the olefin polymer can have a weight average molecular weight greater than 20,000 g/mole. In one embodiment, the weight average molecular weight may be from 20,000 to 150,000 g/mole; in another embodiment, from 50,000 to 100,000 g/mole.

The olefin polymers also include olefin block copolymers, for example, ethylene multi-block copolymer, such as those described in the International Publication No. WO2005/090427 and U.S. patent application Ser. No. 11/376,835. Such olefin block copolymer may be an ethylene/α-olefin interpolymer:

(a) having a $M_w/M_n$ from 1.7 to 3.5, at least one melting point, $T_m$, in degrees Celsius, and a density, d, in grams/cubic centimeter, wherein the numerical values of $T_m$ and d corresponding to the relationship: $T_m > -2002.9 + 4538.5(d) - 2422.2(d)^2$; or (b) having a $M_w/M_n$ from 1.7 to 3.5, and being characterized by a heat of fusion, $\Delta H$ in J/g, and a delta quantity, $\Delta T$, in degrees Celsius defined as the temperature difference between the tallest DSC peak and the tallest CRYSTAF peak, wherein the numerical values of $\Delta T$ and $\Delta H$ having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase: $Re > 1481 - 1629(d)$; or (d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of 1:1 to 9:1.

The ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In one embodiment, the one or more polymeric particulates are selected from the group consisting of ethylene based polymers, and propylene based polymer. In another embodiment the one or more polymeric particulates are foam. In another alternative embodiment, the one or more polymeric particulates comprise one or more ethylene based polymers comprising an ethylene interpolymer. In another alternative embodiment, the one or more polymeric particulates comprise one or more propylene based polymers comprising a propylene interpolymer. In another alternative embodiment, the one or more polymeric particulates comprise one or more interpolymers of ethylene and one or more α-olefin comonomers, or ethylene-propylene-diene-monomer (EPDM). In another alternative embodiment, the one or more polymeric particulates comprise one or more interpolymers of propylene and one or more α-olefin comonomers.

Those having ordinary skill in the art will recognize that the above list is a non-comprehensive listing of suitable polymers. It will be appreciated that the scope of the present invention is restricted by the claims only.

The olefin polymers can be produced using any conventional olefin polymerization technology known in the art. For example, polymerization may be accomplished at conditions well known in the art for Ziegler-Natta or Kaminsky-Sinn type polymerization reactions. The olefin polymers may also be made using a mono- or bis-cyclopentadienyl, indenyl, or fluorenyl transition metal (preferably Group 4) catalysts, constrained geometry catalysts, or metallocene catalysts. Metallocene catalysts and polymerization processes using these catalysts are described and taught in U.S. Pat. No. 5,565,521. Suspension, solution, slurry, gas phase, solid-state powder polymerization or other process conditions may be employed if desired. A support, such as silica, alumina, or a polymer (such as polytetrafluoroethylene or a polyolefin) may also be employed if desired.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene. Suitable solvents also include liquid olefins that may act as monomers or comonomers including butadiene, cyclopentene, 1-hexene, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure and used herein.

The polymer particulates are in the form of particulate solids ranging in size from powders to pellets. Powders are typically defined as particulate solids with an average particle size of less than 2000 microns. Pellets are particulate solids generally, but not exclusively, formed through extrusion and pelletization processes, with a typical average particle size greater than 2 mm, typically 2-10 mm, preferably 2-4 mm. Micropellets typically have an average particle size less than of a standard pellet yet greater than general commercial die capabilities. The average particle size of micropellets range from 300 microns to 2 mm. The micropellets generally exhibit a semi-spheroidal shape.

Blends of the particulate solids of the invention may be made using any known solid mixing or blending process. For example, in "Mixing of Powders", *Handbook of Powder Science and Technology—Second Edition*, Chapman and Hall, pp 568-585 (1997), Kaye mentioned a tumble mixer as a low shear method to generate a bulk mixture. One skilled in the mixing arts could use alternate mixing techniques, such as higher shear equipment described by Kaye, to potentially improve the uniformity of blend dispersion.

(b) Coating Composition

The coating composition is present on at least a portion of at least one surface of one or more polymeric particulates. The coating composition comprises a dispersion comprising: (1) one or more base polymers, (2) one or more stabilizing agents; (3) one or more biocide agents; (4) one or more neutralizing agents; and (5) water. The coating composition forms a coating layer which is associated with the one or more polymeric particulates. The coating layer is derived from the application of one or more aqueous dispersions, as described herein, to at least one surface of one or more polymeric particulates.

Base Polymer

The aqueous dispersion comprises from 5 to 99 percent by weight of one or more base polymers, based on the total weight of the solid content of the aqueous dispersion. All individual values and subranges from 5 to 99 weight percent are included herein and disclosed herein; for example, the weight percent can be from a lower limit of 5, 8, 10, 15, 20, 25 weight percent to an upper limit of 40, 50, 60, 70, 80, 90, 95, or 99 weight percent. For example, the aqueous dispersion may comprise from 15 to 99, or from 15 to 90, or 15 to 80, or from 15 to 75, or from 30 to 70, or from 35 to 65 percent by weight of one or more base polymers, based on the total weight of the solid content of the aqueous dispersion. The aqueous dispersion comprises at least one or more base polymers. The base polymer may, for example, be a thermoplastic material. The one or more base polymers may comprise one or more olefin based polymers.

Examples of thermoplastic materials include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

In selected embodiments, base polymer may, for example, comprise one or more polyolefins selected from the group consisting of ethylene-alpha olefin copolymers, propylene-alpha olefin copolymers, and olefin block copolymers. In particular, in select embodiments, the base polymer may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers, as described in U.S. Pat. No. 3,645,992; high density polyethylene (HDPE), as described in U.S. Pat. No. 4,076,698; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

In other particular embodiments, the base polymer may, for example, be ethylene vinyl acetate (EVA) based polymers. In other embodiments, the base polymer may, for example, be ethylene-methyl acrylate (EMA) based polymers. In other particular embodiments, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In certain other embodiments, the base polymer may, for example, be a semi-crystalline polymer and may have a melting point of less than 110° C. In another embodiment, the melting point may be from 25 to 100° C. In another embodiment, the melting point may be between 40 and 85° C.

In one particular embodiment, the base polymer is a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer may have a melt flow rate in the range of from 0.1 to 25 g/10 minutes, measured in accordance with ASTM D-1238 (at 230° C./2.16 Kg). All individual values and subranges from 0.1 to 25 g/10 minutes are included herein and disclosed herein; for example, the melt flow rate can be from a lower limit of 0.1 g/10 minutes, 0.2 g/10 minutes, 0.5 g/10 minutes, 2 g/10 minutes, 4 g/10 minutes, 5 g/10 minutes, 10 g/10 minutes, or 15 g/10 minutes to an upper limit of 25 g/10 minutes, 20 g/10 minutes, 18 g/10 minutes, 15 g/10 minutes, 10 g/10 minutes, 8 g/10 minutes, or 5 g/10 minutes. For example, the propylene/alpha-olefin copolymer may have a melt flow rate in the range of from 0.1 to 20 g/10 minutes; or from 0.1 to 18 g/10 minutes; or from 0.1 to 15 g/10 minutes; or from 0.1 to 12 g/10 minutes; or from 0.1 to 10 g/10 minutes; or from 0.1 to 5 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via Differential scanning calorimetry (DSC) method. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of units derived from one or more alpha-olefin comonomers. All individual values and subranges from 1 to 40 weight percent are included herein and disclosed herein; for example, the weight percent of units derived from one or more alpha-olefin comonomers can be from a lower limit of 1, 3, 4, 5, 7, or 9 weight percent to an upper limit of 40, 35, 30, 27, 20, 15, 12, or 9 weight percent. For example, the propylene/alpha-olefin copolymer comprises from 1 to 35 percent by weight of units derived from one or more alpha-olefin comonomers; or in the alternative, the propylene/alpha-olefin copolymer comprises from 1 to 30 percent by weight of units derived from one or more alpha-olefin comonomers; or in the alternative, the propylene/alpha-olefin copolymer comprises from 3 to 27 percent by weight of units derived from one or more alpha-olefin comonomers; or in the alternative, the propylene/alpha-olefin copolymer comprises from 3 to 20 percent by weight of units derived from one or more alpha-olefin comonomers; or in the alternative, the propylene/alpha-olefin copolymer comprises from 3 to 15 percent by weight of units derived from one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons, wherein the term long chain branch, as used herein, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches typically does not exceed 3 long chain branches/1000 total carbons. Such propylene/alpha-olefin copolymers are further described in details in the U.S. Provisional Patent Application No. 60/988,999 and International Paten Application No. PCT/US08/082,599, each of which is incorporated herein by reference.

In certain other embodiments, the base polymer, e.g. propylene/alpha-olefin copolymer, may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers, may be used as the base polymer. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and 4H having the following relationships:

$$\Delta T > -0.1299(\Delta H) + 62.81 \text{ for } \Delta H \text{ greater than zero and up to 130 J/g,}$$

$$\Delta T \geq 48°\text{C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In certain embodiments, the base polymer may, for example, comprise a polar polymer, having a polar group as either a comonomer or grafted monomer. In exemplary embodiments, the base polymer may, for example, comprise one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary base polymers include, but are not limited to, ethylene ethyl acrylate (EEA) copolymer, ethylene methyl methacrylate (EMMA), and ethylene butyl acrylate (EBA).

In one embodiment, the base polymer may, for example, comprise a polar polyolefin selected from the group consisting of ethylene-acrylic acid (EAA) copolymer, ethylene-methacrylic acid copolymer, and combinations thereof, and the stabilizing agent may, for example, comprise a polar polyolefin selected from the group consisting of ethylene-acrylic acid (EAA) copolymer, ethylene-methacrylic acid copolymer, and combinations thereof; provided however, that base polymer may, for example, have a lower acid number, measured according to ASTM D-974, than the stabilizing agent.

Those having ordinary skill in the art will recognize that the above list is a non-comprehensive listing of exemplary base polymers. It will be appreciated that the scope of the present invention is restricted by the claims only.

Stabilizing Agent and Neutralizing Agent

The dispersion according to the present invention may further comprise at least one or more stabilizing agents, also referred to herein as dispersion agents, to promote the formation of a stable dispersion. The stabilizing agent may preferably be an external stabilizing agent. The dispersion of the instant invention comprises 1 to 50 percent by weight of one or more stabilizing agents, based on the total weight of the solid content of the dispersion. All individual values and subranges from 1 to 45 weight percent are included herein and disclosed herein; for example, the weight percent can be from a lower limit of 1, 3, 5, 10 weight percent to an upper limit of 15, 25, 35, 45, or 50 weight percent. For example, the dispersion may comprise from 1 to 25, or in the alternative from 1 to 35, or in the alternative from 1 to 40, or in the alternative from 1 to 45 percent by weight of one or more stabilizing agents, based on the total weight of the solid content of the dispersion. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms. In one embodiment, the stabilizing agent is the reaction product of oleic acid and metal hydroxide, for example sodium hydroxide, in the presence of water. In one embodiment, the stabilizing agent is sodium oleate.

The stabilizing agent may be partially or fully neutralized with a neutralizing agent. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl)ethylenediamine, 1.2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

Fluid Medium

The aqueous dispersion further comprises a fluid medium. The fluid medium may be any medium; for example, the fluid medium may be water. The dispersion of the instant invention comprises 35 to 85 percent by weight of fluid medium, based on the total weight of the dispersion. In particular embodiments, the water content may be in the range of from 35 to 80, or in the alternative from 35 to 75, or in the alternative from 45 to 65 percent by weight of the fluid medium, based on the total weight of the dispersion. Water content of the dispersion may preferably be controlled so that the solids content (base polymer plus stabilizing agent) is between about 1 percent to about 80 percent by weight. In particular embodiments, the solids range may be between about 10 percent to about 75 percent by weight. In other particular embodiments, the solids range is between about 20 percent to about 70 percent by weight. In certain other embodiments, the solids range is between about 25 percent to about 60 percent by weight.

Biocide

Synthetic polymer dispersions can be spoiled by microorganisms. To prevent microbial spoilage, it is essential that bio-deterioration be prevented. The two ways of doing so are control of organisms that may come in contact with the product and the use of a sufficiently effective biocide. It is also very important to ensure that the biocide used is stable in the product for the period over which protection is required. Some of the essential properties of polymer dispersion biocides are that they have broad-spectrum anti-microbial activity, be stable over a wide pH range, stable at elevated temperatures (to 50° C.), compatible with the polymer, low environment impact, low toxicity and eco-toxicity, safe to factory workers, cost effective and most importantly have the relevant regulatory approvals. Exemplary biocides include, but are not limited to, heavy metals, e.g., mercury based; formaldehyde/formalin; formaldehyde donors, e.g., triazines, adamantase derivatives; compounds with activated halogen atoms, e.g., 1,2-dibromo-2,4-dicyanobutane (DBDCB) and 2-bromo-2-nitropropane-1,3-diol (Bronopol); 1,2 benzisothiazolin-3-one (BIT); Combination of 5-chloro-2-methyl-4-isothiazolin-3-one (CIT), 2-methyl-4-isothiazolin-3-one (MIT), and 2-methyl-4-isothiazolin-3-one (MIT); and combination of 2-methyl-4-isothiazolin-3-one (MIT) and 1,2 benzisothiazolin-3-one (BIT). The weight of one of more active ingredients of the biocide in the aqueous dispersion is from 0.001 to 0.1 by total weight of the dispersion. All individual values and subranges from 0.001 to 0.1 are included herein and disclosed herein; for example, the weight percent of the biocide can be from a lower limit of 0.001, 0.002, 0.005 or 0.01, to an upper limit of 0.0125, 0.015, 0.02, 0.025, 0.05, 0.075, or 0.01. For example, the weight percent of the biocide may be in the range of from 0.005 to 0.025, or in the alternative, the biocide may be in the range of from 0.01 to 0.02.

Forming the Dispersion

The dispersion according to the present invention can be formed by any number of methods recognized by those having skill in the art. In one embodiment, one or more base polymers, one or more subparticles, and optionally one or more stabilizing agents are melt-kneaded in an extruder along with water and a neutralizing agent, such as ammonia, potassium hydroxide, or a combination of the two to form a dispersion. In another embodiment, one or more base polymers and one or more subparticles are compounded, and then the base polymer/subparticles compound is melt-kneaded in an extruder in the presence of an optional stabilizing agent, water, and one or more neutralizing agents thereby forming a dispersion. In some embodiments, the dispersion is first diluted to contain about 1 to about 3% by weight water and then, subsequently, further diluted to comprise greater than about 25% by weight water.

Any melt-kneading means known in the art may be used. In some embodiments, a kneader, a BANBURY® mixer, single-screw extruder, or a multi-screw extruder, e.g. a twin screw extruder, is used. The melt kneading process may be a continuous process, or in the alternative, the melt kneading process may be in a batch process. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more base polymers, in the form of pellets, powder, or flakes, are fed from the feeder to an inlet of the extruder where the resin is melted. In some embodiments, the stabilizing agent is added to one or more base polymers through and along with the resin and in other embodiments, the stabilizing agent is provided separately to the twin screw extruder. The resin melt is then delivered from the mix and convey zone to an emulsification zone of the extruder where the initial amount of water and base from the water and base reservoirs are added through an inlet. In some embodiments, the stabilizing agent may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

In one embodiment, method for producing polymeric particulates comprises the steps of: (a) selecting one or more polymeric particulates; (b) selecting a coating composition comprising a dispersion comprising: (1) one or more base polymers, (2) one or more stabilizing agents, (3) one or more biocide agents, (4) one or more neutralizing agents, and (5) water; (c) applying said coating composition to at least one or more surfaces of said one or more polymeric particulates; and (d) thereby forming one or more coated polymeric particulates.

Application of Dispersion to Polymeric Particulates

Figure 3:
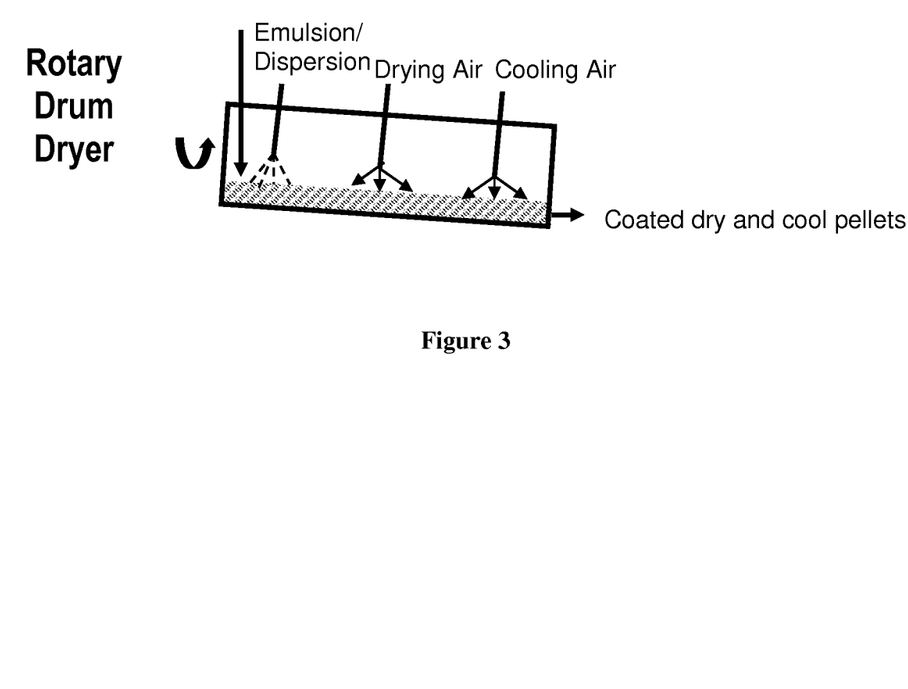
FIG. 3 is an illustrative diagram showing a first process embodiment according to instant invention.

In application dispersion to polymeric particulates, referring to FIG. 3, the coating composition comprising the dispersion, as described herein, is sprayed on the polymeric particulates in a rotary drum dryer thereby at least partially coating the polymeric particulates with the coating composition. The at least partially coated polymeric particulates with the coating composition are then subject to heat, and subsequently to cooling air thereby forming a coated polymeric particulate.

Figure 4:
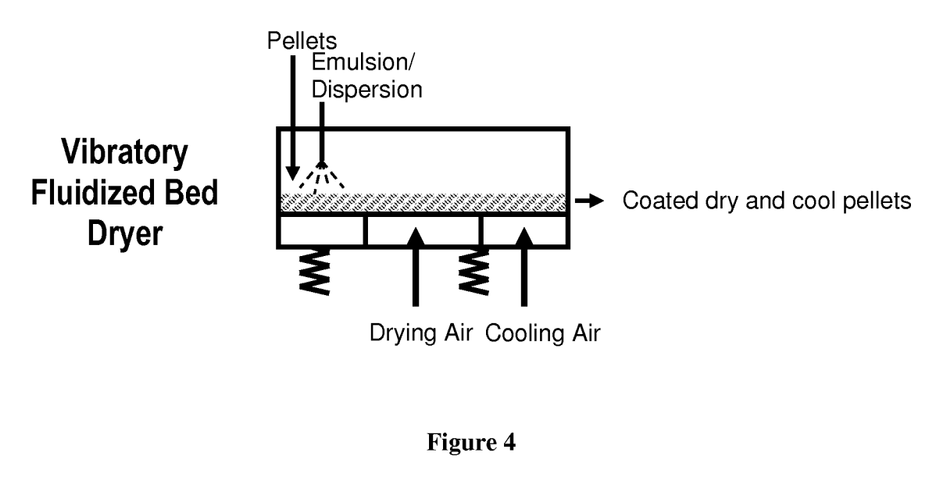
FIG. 4 is an illustrative diagram showing a second process embodiment according to instant invention.

In an alternative application, referring to FIG. 4, the coating composition comprising the dispersion, as described herein, is sprayed on the polymeric particulates in a vibratory fluidized bed dryer thereby at least partially coating the polymeric particulates with the coating composition. The at least partially coated polymeric particulates with the coating composition are then subject to heat, and subsequently to cooling air thereby forming a coated polymeric particulate.

Figure 5:
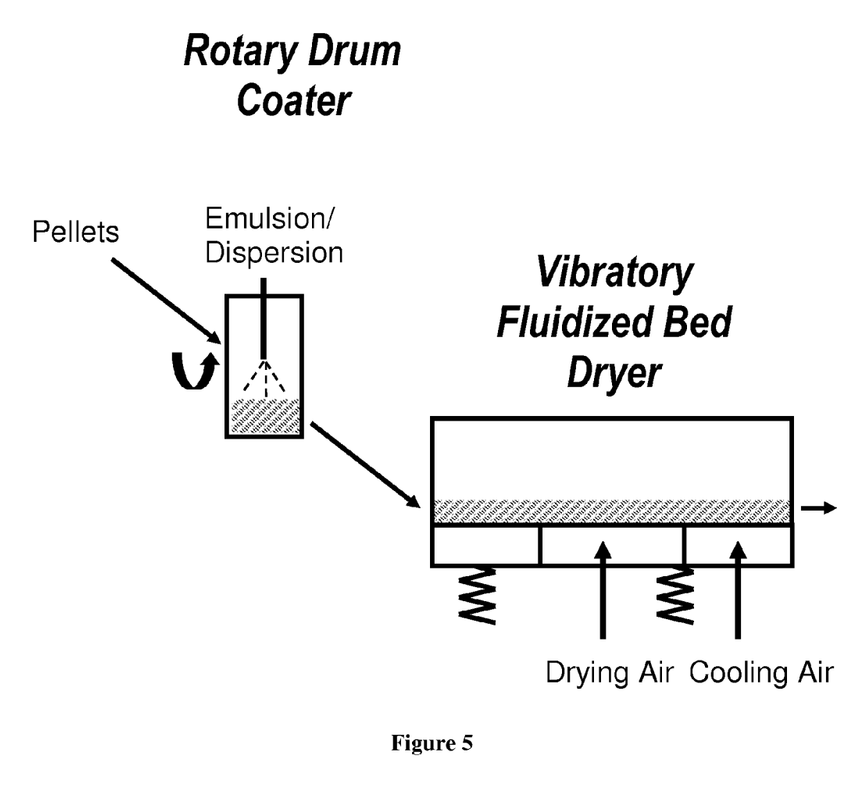
FIG. 5 is an illustrative diagram showing a third process embodiment according to instant invention.

In an alternative application, referring to FIG. 5, the coating composition comprising the dispersion, as described herein, is sprayed on the polymeric particulates in a rotary drum dryer thereby at least partially coating the polymeric particulates with the coating composition. The at least partially coated polymeric particulates with the coating composition are then transferred to a vibratory fluidized bed dryer, and subjected to heat first and subsequently to cooling air thereby forming a coated polymeric particulate.

The drying step may be via any conventional drying methods. Such conventional drying methods include but, are not limited to, air drying, convection oven drying, hot air drying, microwave oven drying, and/or infrared oven drying. The coating composition may be dried at any temperature; for example, it may be dried at an elevated temperature in the range of less than the melting point temperature of the polymeric particulates. The temperature of the coated polymeric particulates may be raised to a temperature in the range of less than the melting point temperature of the polymeric particulates for a period of less than 40 minutes. All individual values and subranges from less than about 40 minutes are included herein and disclosed herein; for example, the temperature of the coated polymeric particulates may be raised to a temperature in the range of less than the melting point temperature of the polymeric particulates for a period of less than 20 minutes, or in the alternative, the temperature of the coated polymeric particulates may be raised to a temperature in the range of less than the melting point temperature of the polymeric particulates for a period of less than 5 minutes, or in another alternative, the temperature of the coated polymeric particulates may be raised to a temperature in the range of less than the melting point temperature of the polymeric particulates for a period of less than 0.5 to 300 seconds.

Referring to FIG. 5, the coated polymeric particulates of the instant invention have a coating present on at least a portion of at least one surface of the polymeric particulates. The coating is derived from a coating composition comprising a polyolefin dispersion has been components listed in Table 1. The coated polymeric particulates of the instant invention have a relative stickiness index, as described hereinbelow, of less than 20 percent. All individual values and subranges in the range of less than 20 percent are included herein and disclosed herein; for example, the coated polymeric particulates of the instant invention have a relative stickiness index of less than 18 percent; or in the alternative, the coated polymeric particulates of the instant invention have a relative stickiness index of less than 15 percent; or in the alternative, the coated polymeric particulates of the instant invention have a relative stickiness index of less than 14 percent; or in the alternative, the coated polymeric particulates of the instant invention have a relative stickiness index of less than 10 percent.

EXAMPLES

The following examples illustrate the present invention but are not intended to limit the scope of the invention. The examples of the instant invention demonstrate improved properties with regard to blocking and/or stickiness problems.

Inventive Example 1

Figure 1:
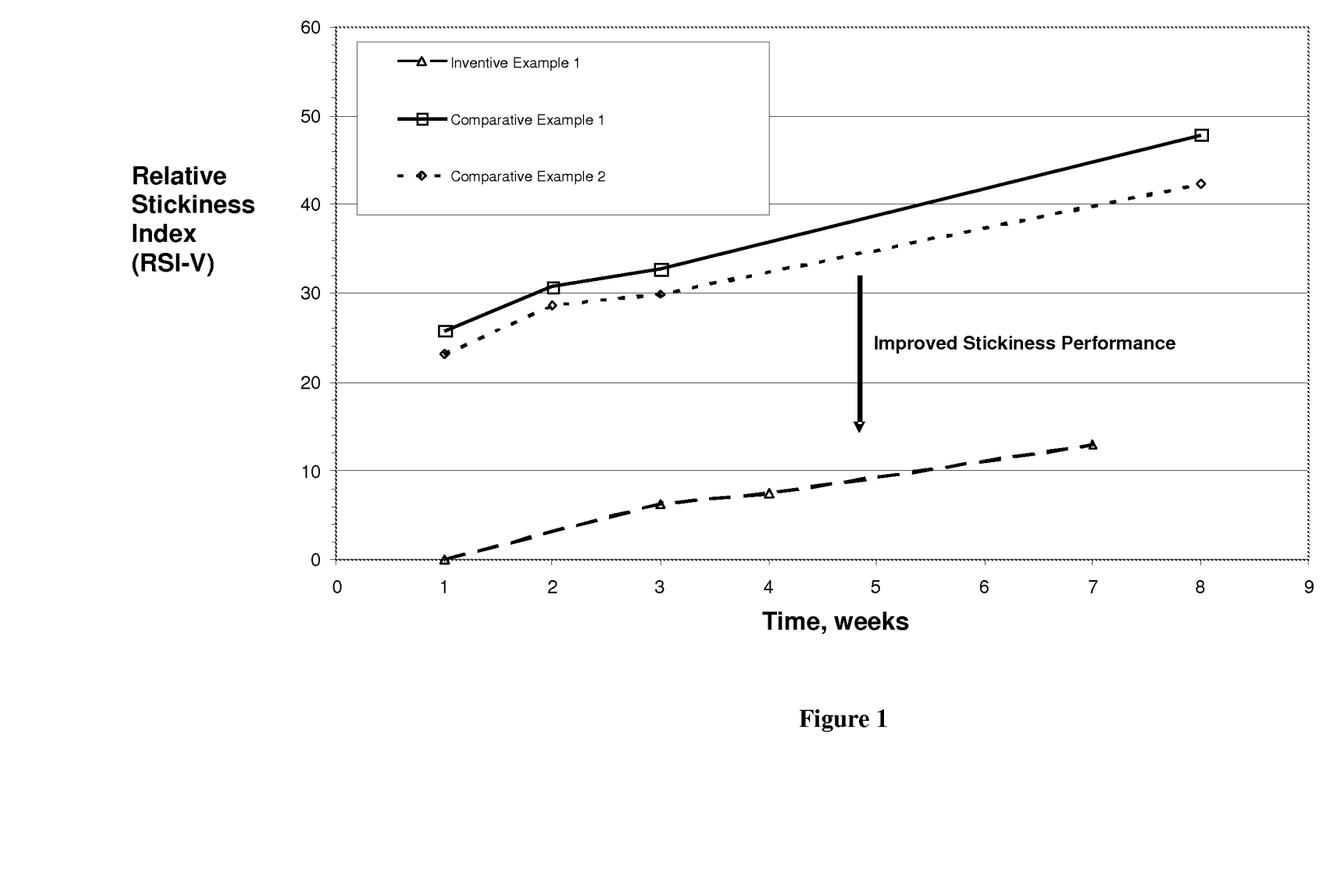
FIG. 1 is a graph illustrating the relationship between the relative stickiness index and time of the inventive and comparative examples.

INFUSE™ OBC D9807 (an olefin block copolymer having 15 g/10 minutes melt index, and 0.866 g/cc overall density) pellets were coated with coating composition comprising a dispersion, having approximately 43.6 weight percent solids content, and approximately 56.4 weight percent water content, as shown in Table 1, having a volume average particle size diameter of approximately 1.1 micrometer. The coating composition was applied to the pellets tumbled in a drum and then dried via hot air at 40° C. The coating level was approximately 5000 ppm on dry basis. The pellets were tested for stickiness using the funnel test method. Pellet stickiness properties were measured up to an eight week period, and the results are reported in FIG. 1. The discharge rates were compared with initial rates and with talc coated samples, i.e. Comparative Example 1 and 2. A reduction of greater +15% in discharge rate indicates significant increase in surface tackiness. The Inventive Example 1 showed substantial improvement in anti-sticky behavior, and did not have free dust. The results are summarized in FIG. 1.

Comparative Example 1

INFUSE™ OBC D9807 (an olefin-block copolymer having 15 g/10 minutes melt index, and 0.866 g/cc overall density) pellets were coated with talc, tested for stickiness using the funnel test method. The coating level was approximately 3000 ppm on dry basis. The results are summarized in FIG. 1.

Comparative Example 2

INFUSE™ OBC D9807 (an olefin-block copolymer having 15 g/10 minutes melt index, and 0.866 g/cc overall density) pellets were coated with talc, tested for stickiness using the funnel test method. The coating level was approximately 5000 ppm on dry basis. The results are summarized in FIG. 1.

Inventive Example 2

Figure 2:
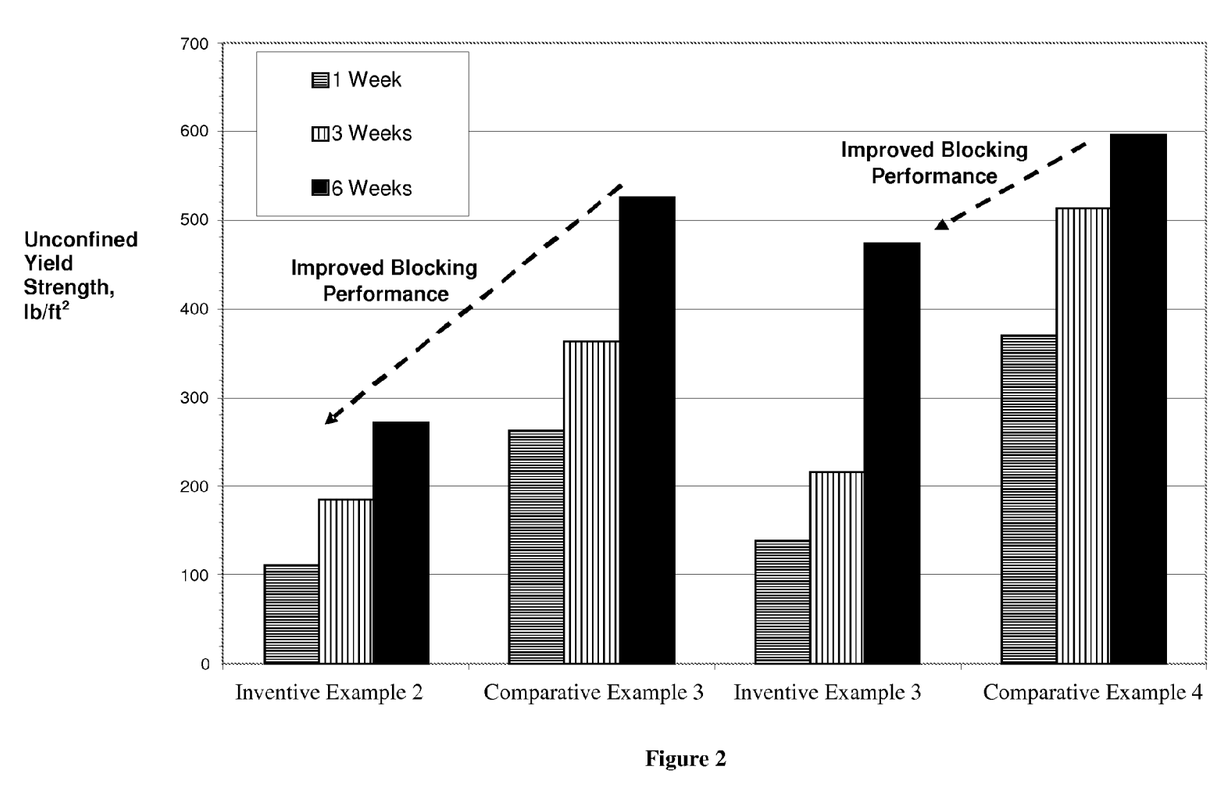
FIG. 2 is a graph illustrating the relationship between the unconfined yield strength and time of the inventive and comparative examples.

NORDEL™ IP 4770 R (ethylene-propylene-diene-terpolymer) rods were coated with a coating composition comprising a dispersion, having approximately 43.6 weight percent solids content, and approximately 56.4 weight percent water content, as shown in Table 1, having a volume average particle size diameter of approximately 1.1 micrometer. The coating composition was applied to the rods tumbled in a drum and then dried via hot air at 40° C. The coating level was approximately 5000 ppm on dry basis. The Inventive Example 2 was tested for pellet (rod) blockiness. The coated pellets did not have free dust. The results are summarized in FIG. 2.

Inventive Example 3

NORDEL™ IP 3720 P(ethylene-propylene-diene-terpolymer) pellets were coated with a coating composition comprising a dispersion, having approximately 43.6 weight percent solids content, and approximately 56.4 weight percent water content, as shown in Table 1, having a volume average particle size diameter of approximately 1.1 micrometer. The coating composition was applied to the pellets tumbled in a drum and then dried via hot air at 40° C. The coating level was approximately 5000 ppm on dry basis. The Inventive Example 2 was tested for pellet blockiness. The coated pellets did not have free dust. The results are summarized in FIG. 2.

Comparative Example 3

NORDEL™ IP 4770 R (ethylene-propylene-diene-terpolymer) rods were coated with polyethylene dust, commercially available under the tradename COATHYLENE HA 2454, from DuPont, tested for pellet (rod) blockiness. The coating level was approximately 8000 ppm on dry basis. The results are summarized in FIG. 2.

Comparative Example 4

NORDEL™ IP 3720 P(ethylene-propylene-diene-terpolymer) pellets were coated with polyethylene dust, commercially available under the tradename COATHYLENE HA 2454, from DuPont, tested for pellet blockiness. The coating level was approximately 8000 ppm on dry basis. The results are summarized in FIG. 2.

TABLE 1

| Dispersion Components | Dispersion Component Concentration (wt %) |
|---|---|
| Water | 56.4 |
| ENGAGE 8402 | 40.1 |
| Sodium oleate | 3.5 |
| Oleic acid, residual | 0.003 |
| NaOH, residual | 0.004 |

Test Methods

Test methods include the following:
Density was measured according to ASTM D 792-03, Method B, in isopropanol.
Melt index ($I_2$) is measured at 190° C. under a load of 2.16 kg according to ASTM D-1238-03.
Melt index ($I_5$) is measured at 190° C. under a load of 5 kg according to ASTM D-1238-03.
Melt index ($I_{10}$) is measured at 190° C. under a load of 10 kg according to ASTM D-1238-03.
Melt index ($I_{21}$) is measured at 190° C. under a load of 21.6 kg according to ASTM D-1238-03.
Volume average particle size diameter was determined via Beckman Coulter LS13 320 Laser Diffraction Particle Size Analyzer.

Blockiness Test

To quantify the blockiness of various soft elastomeric pellets and estimate their potential to block (or mass), the following test was employed. A given sample of pellets is consolidated under a pre-determined stress condition ($\sigma_1$) at storage temperature for predetermined duration. The sample is then crushed uniaxially at constant strain rate using an Instron™ machine. The peak stress ($\sigma_c$) corresponding to compressive failure of the sample is a measure of pellet blockiness.

To standardize the test conditions, typical values of highest stress are calculated for various shipping modes. The maximum stress (lb/ft$^2$) is calculated by multiplying the bulk density (lb/ft$^3$) with total height of the material (ft). A temperature of 37° C. was the temperature reference for testing.

The pellets are loaded into a 2" diameter cylinder with a height to diameter ratio of 2.5. It is made up of two halves held together by a hose clamp. Appropriate consolidation load is applied. The pellets under load are left in an oven at 37° C. for extended duration (typically 4 to 16 weeks).

The cell is then removed from the oven; consolidation load is removed and allowed to cool overnight in an environmental chamber at 21° C. The cell is placed on the platform of Instron™ test machine. The two halves of the split cell are separated after removing the hose clamp. If the material is totally free-flowing, the pellets will not hold the form of a cylinder and simply collect into a pile. If the consolidated mass of pellets does hold the form of a cylinder, the Instron™ machine is used to measure the maximum force required to crush the cylinder. A constant strain rate of 2 mm/min was used for this test. In a typical force vs. time plot, the peak strength or peak force divided by the cross-sectional area of the cylinder is called the unconfined yield strength. The unconfined yield strength (lb/ft$^2$) is a measure of blockiness of pellets subjected to stress, time and temperature history. A zero value corresponds to free-flowing pellets.

Funnel Test for Pellet Stickiness

To quantify pellet-pellet stickiness, the funnel test was employed. This test is based on the basic concept that increased interparticle interaction (stickiness) will reduce discharge rate out of a steep funnel. The change in discharge rate can be related to change in surface properties of a sample.

The test apparatus consists of a steep glass funnel attached to a cylinder (4.15 inch diameter). The test is repeated 5 times for statistical purpose. The discharge rate of pellets is measured as received and after conditioning them at a given temperature for pre-determined duration. The conditioned pellets are cooled overnight at 21° C. to achieve constant temperature. The steps of the funnel test to test resins as received include: (1) Load the funnel with ~2500 g of pellets; (2) Measure the time take to completely discharge the pellets; and (3) Repeat the test 5 times. The steps of the funnel test to test cured resins include: (1) Cure ~2500 g of sample at following temperatures (21/37/42° C.) for X (4 and 8) week; (2) Remove the samples from the oven and allow it to cool for 12 hours at 21° C. (3) Load the funnel with pellets; (4) Measure the time take to completely discharge the pellets; and (5) Repeat the test 5 times.

The change in discharge rate is normalized with initial rate to give a dimensionless quantity—RSI (Relative Stickiness Index).

$$RSI(\%) = \frac{\text{Change in discharge rate (Fresh sample} - \text{After Conditioning)}}{\text{Discharge rate of fresh sample}} \times 100$$

Discharge rate can be gravimetric (lb/s) or volumetric (ft$^3$/s).

By normalizing with discharge rate of fresh sample and using change in discharge rate in the numerator, the effect of granulation and friction can be eliminated.

This index is relative and not absolute. It measures change in stickiness or tackiness as compared to the fresh sample (with no stickiness/tackiness).

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

DSC Standard Method

Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431 (M_{polystyrene})$.

Polyethylene equivalent molecular weight calculations are performed using Viscotek TriSEC software Version 3.0.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety).

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Block Index

The ethylene/α-olefin interpolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$$2^{nd} \text{ moment weight average } BI = \sqrt{\frac{\Sigma (w_i(BI_i - ABI)^2)}{\frac{(N-1)\Sigma w_i}{N}}}$$

where N is defined as the number of fractions with $BI_i$ greater than zero. BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the ATREF (i.e., analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the olefin block copolymer. $T_{AB}$ can be calculated from the mole fraction of ethylene (measured by NMR) using the following equation:

$$LnP_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$LnP = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $LnPX = \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from $Ln\, P_{XO} = \alpha/T_X + \beta$ using a measured value of $T_X$.

Once the block index (BI) for each preparative TREF fraction is obtained, the weight average block index, ABI, for the whole polymer can be calculated.

The present invention may be embodied in other forms without departing from the spirit and the essential attributes thereof, and, accordingly, reference should be made to the appended claims, rather than to the foregoing specification, as indicating the scope of the invention.

We claim:

1. A coated polymeric particulate comprising:
    one or more polymeric particulates; and
    a coating layer, in dried form, formed from only one coating composition, derived from one aqueous dispersion, and present on at least a portion of at least one surface of said polymeric particulates, wherein the coating layer is derived from the application of the dispersion to at least one surface of one or more of said polymeric particulates, and wherein the dispersion consists of:
    an ethylene/alpha-olefin copolymer;
    one or more stabilizing agents;
    one or more biocide agents;
    one or more neutralizing agents; and
    water, and
    wherein said one or more biocide agents are selected from the group consisting of the following: [heavy metals], [formaldehyde], [formaldehyde donors], [cyanobutanes], [isothiazolinones], [combination of 5-chloro-2-methyl-4-isothiazolin-3-one (CIT) and 2-methyl-4-isothiazolin-3-one (MIT)], [2-methyl-4-isothiazolin-3-one (MIT)], and [combination of 2-methyl-4-isothiazolin-3-one (MIT) and 1,2 benzisothiazolin-3-one (BIT)].

2. The coated polymeric particulate of claim 1, wherein said one or more polymeric particulates are selected from the group consisting of the following: ethylene based polymers and propylene based polymer.

3. The coated polymeric particulate according to claim 2, wherein said ethylene based polymer comprises an ethylene interpolymer.

4. The coated polymeric particulate according to claim 3, wherein said ethylene interpolymer is an interpolymer of ethylene and one or more α-olefin comonomers, or ethylene-propylene-diene-monomer (EPDM).

5. The coated polymeric particulate according to claim 2, wherein said propylene based polymer comprises a propylene interpolymer.

6. The coated polymeric particulate according to claim 5, wherein said propylene interpolymer is an interpolymer of propylene and one or more α-olefin comonomers.

7. The coated polymeric particulate of claim 1, wherein said one or more polymeric particulates comprises a foam.

8. The coated polymeric particulate according to claim 1, wherein said stabilizing agent comprises the reaction product of oleic acid and metal hydroxide in the presence of said water.

9. The coated polymeric particulate according to claim 8, wherein said metal hydroxide is NaOH, or KOH.

10. The coated polymeric particulate according to claim 1, wherein said dispersion has a pH in the range of greater than 8 and less than 12.

11. The coated polymeric particulate according to claim 1, where said dispersion has a volume average particle size diameter in the range of from 0.1 to 5 micrometer.

12. The coated polymeric particulate according to claim 1, wherein said dispersion has a solid content in the range of 35 to 65 weight percent, based on the total weight of the dispersion.

13. The coated polymeric particulate according to claim 1, wherein the ethylene/alpha-olefin copolymer of the dispersion is an ethylene/octene copolymer.

14. The coated polymeric particulate according to claim 1, wherein the dispersion has a volume average particle size diameter in the range of from 0.1 to 1 micrometer.

15. A method for producing the coated polymeric particulates of claim 1 comprising the steps of:
    selecting one or more polymeric particulates,
    selecting a coating composition consisting essentially of a dispersion consisting of:
        an ethylene/alpha-olefin copolymer;
        one or more stabilizing agents;
        one or more biocide agents;
        one or more neutralizing agents; and
        water;
    applying said coating composition to at least one or more surfaces of said one or more polymeric particulates;
    thereby forming one or more coated polymeric particulates, and,
    wherein said one or more biocide agents are selected from the group consisting of the following: [heavy metals], [formaldehyde], [formaldehyde donors], [cyanobutanes], [isothiazolinones], [combination of 5-chloro-2-methyl-4-isothiazolin-3-one (CIT) and 2-methyl-4-isothiazolin-3-one (MIT)], [2-methyl-4-isothiazolin-3-one (MIT)], and [combination of 2-methyl-4-isothiazolin-3-one (MIT) and 1,2 benzisothiazolin-3-one (BIT)].

16. The method for producing polymeric particulates of claim 15, wherein the ethylene/alpha-olefin copolymer of the dispersion is an ethylene/octene copolymer.

* * * * *